(12) United States Patent
Virtanen et al.

(10) Patent No.: US 10,266,688 B2
(45) Date of Patent: Apr. 23, 2019

(54) SURFACE-MODIFIED CELLULOSE NANOFIBRES, BIO COMPOSITE RESIN COMPOSITION AND METHOD FOR PRODUCING THE SAME

(71) Applicant: Teknologian tutkimuskeskus VTT Oy, Espoo (FI)

(72) Inventors: Sanna Virtanen, Espoo (FI); Sauli Vuoti, Espoo (FI); Panu Lahtinen, Espoo (FI); Harri Setälä, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 44 days.

(21) Appl. No.: 14/914,004

(22) PCT Filed: Sep. 8, 2014

(86) PCT No.: PCT/FI2014/050681
§ 371 (c)(1),
(2) Date: Feb. 24, 2016

(87) PCT Pub. No.: WO2015/033026
PCT Pub. Date: Mar. 12, 2015

(65) Prior Publication Data
US 2016/0208087 A1    Jul. 21, 2016

(30) Foreign Application Priority Data

Sep. 6, 2013 (FI) ................................ 20135900

(51) Int. Cl.

| | | |
|---|---|---|
| C08J 5/06 | (2006.01) |
| C08J 5/18 | (2006.01) |
| C08L 1/08 | (2006.01) |
| C08B 11/20 | (2006.01) |
| C08J 3/215 | (2006.01) |
| C08L 29/04 | (2006.01) |
| D06M 11/50 | (2006.01) |
| D06M 13/03 | (2006.01) |
| D06M 13/11 | (2006.01) |
| D21H 11/18 | (2006.01) |
| D21H 11/20 | (2006.01) |
| D21H 13/02 | (2006.01) |
| D21H 17/36 | (2006.01) |
| D21H 21/52 | (2006.01) |
| C08B 11/187 | (2006.01) |
| D06M 101/06 | (2006.01) |

(52) U.S. Cl.
CPC ............ *C08L 29/04* (2013.01); *C08B 11/187* (2013.01); *C08B 11/20* (2013.01); *C08J 3/215* (2013.01); *C08J 5/06* (2013.01); *C08J 5/18* (2013.01); *D06M 11/50* (2013.01); *D06M 13/03* (2013.01); *D06M 13/11* (2013.01); *D21H 11/18* (2013.01); *D21H 11/20* (2013.01); *D21H 13/02* (2013.01); *D21H 17/36* (2013.01); *D21H 21/52* (2013.01); *C08J 2329/04* (2013.01); *C08J 2401/02* (2013.01); *D06M 2101/06* (2013.01)

(58) Field of Classification Search
CPC .................... D21H 11/20; D21H 13/02–13/06
See application file for complete search history.

(56) References Cited

U.S. PATENT DOCUMENTS

| | | | | |
|---|---|---|---|---|
| 3,640,734 A * | 2/1972 | Oppenheimer | ..... | B29C 47/0026 138/118.1 |
| 3,640,735 A * | 2/1972 | Oppenheimer | ..... | B29C 47/0026 138/118.1 |
| 5,728,824 A * | 3/1998 | Narayan | .................... | C08L 1/02 524/35 |
| 6,703,497 B1 | 3/2004 | Ladouce et al. | | |
| 2005/0067730 A1* | 3/2005 | Yano | ........................ | D21C 5/02 264/109 |
| 2007/0178251 A1* | 8/2007 | Kawabe | ................. | C09J 129/04 428/1.31 |
| 2008/0118765 A1* | 5/2008 | Dorgan | .................. | B82Y 30/00 428/532 |
| 2009/0308552 A1* | 12/2009 | Yano | ........................ | C08B 1/003 162/164.3 |
| 2010/0272980 A1* | 10/2010 | Kowata | ................... | C08B 11/02 428/220 |
| 2011/0020917 A1* | 1/2011 | Wen | ........................ | A61L 27/50 435/283.1 |

(Continued)

FOREIGN PATENT DOCUMENTS

| | | |
|---|---|---|
| CN | 102791911 A | 11/2012 |
| JP | 2002524618 A | 8/2002 |

(Continued)

OTHER PUBLICATIONS

Stenstad et al. (Cellulose (2008) 15:35-45) (Year: 2008).*
Arola et al. (Biomacromolecules 2012, 13, 594-603) (Year: 2012).*
Sreedhar et al. (Journal of Applied Polymer Science, vol. 101, 25-34, 2006) (Year: 2006).*
Khalil et al: Green composites from suistainable cellulose nanofibrils: A review. Carbohydrate Polymers, Applied Sci.Publ., vol. 87, No. 2, Aug. 24, 2011, pp. 963-979.
Stenstad et al: Chemical surface modifications of microfibrillated cellulose. Cellulose, Kluwer Academic Publishers, vol. 15, No. 1, Jul. 25, 2007, pp. 35-45.

(Continued)

*Primary Examiner* — Liam J Heincer
(74) *Attorney, Agent, or Firm* — Seppo Laine Oy

(57) ABSTRACT

The present invention relates to surface-modified cellulose nanofibers, which are used to improve fiber-matrix adhesion, resulting in biodegradable nanofibrillated cellulose (NFC)-polyvinyl alcohol (PVOH) composites, which can be used to form structures such as films, with excellent mechanical performance. Particularly, the present invention relates to a bio composite resin composition wherein the surface of cellulose nanofibers have been chemically modified, a method for producing such composite resin composition and a casting-sheet composite body.

6 Claims, 3 Drawing Sheets

(56) References Cited

U.S. PATENT DOCUMENTS

| | | | |
|---|---|---|---|
| 2011/0036522 A1* | 2/2011 | Ankerfors | D21C 9/002 162/26 |
| 2011/0263756 A1* | 10/2011 | Yano | C08J 5/045 524/13 |
| 2012/0125547 A1* | 5/2012 | Akai | B82Y 30/00 162/9 |
| 2012/0237761 A1 | 9/2012 | Mukai et al. | |
| 2012/0277351 A1* | 11/2012 | Yano | D21D 1/34 524/35 |
| 2012/0298319 A1* | 11/2012 | Fujiwara | B01D 67/0004 162/100 |
| 2012/0309898 A1* | 12/2012 | Hamada | C08B 15/05 525/54.23 |
| 2012/0328877 A1 | 12/2012 | Shiramizu et al. | |
| 2013/0005866 A1* | 1/2013 | Yano | B29B 15/08 524/13 |
| 2013/0005869 A1* | 1/2013 | Yano | C08B 11/145 524/43 |
| 2013/0025920 A1* | 1/2013 | Shimizu | C08J 3/09 174/258 |
| 2013/0101763 A1* | 4/2013 | Dean | D21H 11/18 428/34.2 |
| 2013/0171439 A1* | 7/2013 | Shoseyov | B82Y 30/00 428/220 |
| 2013/0284387 A1* | 10/2013 | Umemoto | C08J 5/045 162/9 |
| 2013/0345341 A1* | 12/2013 | Harada | B82Y 30/00 524/35 |
| 2014/0088252 A1* | 3/2014 | Harlin | C08B 11/187 525/54.23 |
| 2015/0005413 A1* | 1/2015 | Yamazaki | C08J 5/043 523/447 |
| 2015/0038038 A1* | 2/2015 | Korley | D06M 15/55 442/166 |
| 2015/0166741 A1* | 6/2015 | Ikuma | C08B 3/12 524/37 |
| 2015/0267070 A1* | 9/2015 | Tsuji | C08L 1/02 106/163.01 |

FOREIGN PATENT DOCUMENTS

| | | |
|---|---|---|
| JP | 2010242063 A | 10/2010 |
| JP | 2011027898 A | 2/2011 |
| JP | 2011105799 A | 6/2011 |
| JP | 2011127075 A | 6/2011 |
| JP | 2011184816 A | 9/2011 |
| JP | 2012177771 A | 9/2012 |
| JP | 2013117823 A | 6/2013 |
| WO | WO2011147825 A1 | 12/2011 |
| WO | WO2012127119 A2 | 9/2012 |

OTHER PUBLICATIONS

Siró et al: Microfibrillated cellulose and new nanocomposite materials: a review. Cellulose, vol. 17, No. 3, Feb. 21, 2010, pp. 459-494.
Virtanen et al.: High strength modification nanofibrillated cellulose-polyvinyl alcohol films. Cellulose, vol. 21, No. 5, Jul. 20, 2014, pp. 3561-3571.

* cited by examiner

SURFACE-MODIFIED CELLULOSE NANOFIBRES, BIO COMPOSITE RESIN COMPOSITION AND METHOD FOR PRODUCING THE SAME

BACKGROUND OF THE INVENTION

Field of the Invention

The present invention relates to cellulose nanofibres, a bio composite resin composition and a method for producing a bio composite resin composition. Particularly, the present invention relates to chemically modified cellulose nanofibres, a bio composite resin composition comprising a matrix of nanofibrillated surface-modified cellulose (NFC) and polyvinyl alcohol (PVOH), a method for producing NFC-PVOH bio composite resin composition, a casting-sheet bio composite body and a use thereof for producing biodegradable composites.

Description of Related Art

Cellulose is one of the most abundant biopolymers in nature, and it has been modified in several ways to overcome the difficulties experienced in compatibility. Nanofibrillated cellulose (NFC) is a new potential building block for bio-nanocomposites, which offers further means for biopolymer modification and interesting new qualities, such as a highly reactive surface and the opportunity to make lighter, strong materials with greater durability. NFC displays high stiffness and strength, and its hydroxyl groups offer reactive sites for chemical modification. Furthermore NFC is attractive reinforcing filler in thermoplastic matrix materials due to its low density, biodegradability, renewability, low cost and gas barrier properties.

Nanocellulose has been used for composite materials in the prior art. For example, Chinese patent CN 10240861 B describes a high barrier nanocellulose composite material and its preparation method. However, the material described comprises 0.2 wt-% to 10 wt-% of unmodified nanocellulose, which is introduced into a poly fatty acid ester material.

Among the biofibre-reinforced polymer composites the major challenge has been the incompatibility of fibres to polymer matrix. Generally that is why the biopolymer based films are limited in their ability to obtain wide commercial application due to disadvantages in mechanical properties and brittleness.

Chemical modification of the fibres is a large research area that currently investigates how to improve compatibility of fibres in matrix polymer. Different chemical surface modification methods of cellulose have been published (Stenstad et al. 2008; Cai et al. 2003; Wu et al. 2000). One of the most promising means of modification has been to introduce functional epoxy groups into the biopolymer structure surface. Epoxy groups serve as capable cross-linkers and additionally bind to polyamines, peptides and amino acids (Arola et al. 2012; Bai et al. 2006; Huijbrechts et al. 2010). Epoxy groups have been introduced into the biopolymer surface using direct epoxidation methods (Burton and Harding 1997; Tomasik and Schilling 2004). The drawbacks using these methods have been the use of hazardous materials and various side reactions.

However, it is also possible to prepare epoxy cellulose by using allyl cellulose as an intermediate product. Allyl cellulose is a derivative that offers a pathway for various subsequent reactions due to the high reactivity of the allyl double bonds (Heinze et al. 2008; Lin and Huang 1992; Mu-Shih and Chung-Song 1992). Epoxy cellulose can alternatively be prepared by oxidizing the allyl double bonds and such a procedure has been previously described for starch (Huijbrechts et al. 2010) and cellulose fibres (Arola et al. 2012). However, the methods described in the articles have limitations and high degree of substitution is not achievable.

Patent application JP 2011184816 A relates to surface-modified cellulose nanofibres and a composite resin composition thereof. In this Japanese application surface modification has also been carried out to hydroxyl groups of cellulose fibres. However, the used modification method has limitations and, among others, results in lower degree of surface modification.

WO 2012/127119 relates to a method for producing a bio composite resin composition and its use for producing biodegradable compositions. However, the products obtained are still limited in their ability to obtain wide commercial application because of their inadequate mechanical properties and brittleness.

Use of nanocellulose to reinforce a polyvinyl alcohol matrix has also been studied in the prior art. For example, Hu et al. (2012) describe reinforced polyvinyl alcohol (PVA) with nanocellulose fibrils generated from poplar and cotton with mechano-chemical treatment (acid/alkali treatment enhanced with grinding). In this article researchers have produced PVA/nanocellulose composite by an immersion method followed by drying the solution. However, the nanocellulose fibrils are not chemically modified, resulting in a certain incompatibility of the fibres to polymer matrices.

Bionanocomposites or bio-based nanocomposites are materials made from renewable materials with at least one component having a dimension smaller than 100 nm (e.g., microfibrillated cellulose, MFC, or nanocellulose, NFC). Polymer composites include a polymer matrix component, common examples being petroleum-derived polymers such as polypropylene (PP) and polyethylene (PE). These polymer nanocomposites contain low quantities of well-dispersed nano-sized fillers to obtain high mechanical performance (Siqueira et al. 2010). The properties of the resulting polymer nanocomposites are therefore not ideal, because adhesion between e.g. nanocellulose fibres and matrix polymer is weak and fibre dispersion to polymer material needs improvement.

Currently, there is an increasing global demand for biodegradable plastic resins and environmentally sustainable bio composite products. Consequently, the price of suitable raw materials for use in preparing the composites, such as polyvinyl alcohol, is increasing. By utilizing epoxidized nanofibrillated cellulose as filler in e.g. polyvinyl alcohol matrix it is possible to reduce the amount of polyvinyl alcohol and produce new composite materials to different market sectors. Hence, the present invention provides new value-added and biodegradable PVOH-based composites.

SUMMARY OF THE INVENTION

One aim of the invention is to provide modified cellulose nanofibres with natural fibre reinforcement.

Another aim of the invention is to provide novel high performance biocomposite materials, wherein surface-modified cellulose nanofibres have been utilized to improve adhesion and mechanical performance.

A particular aim of the invention is to provide a method for producing such biocomposite materials using a limited number of process steps.

In the present invention cellulose fibres are defibrillated and chemically modified by using at least a dry modification step, wherein hydroxyl groups on the surface of cellulose nanofibres are modified to enhance their functionality.

These and other objects are achieved by the present invention as described and claimed herein.

One particular advantage of the present invention is that it provides a bio composite resin composition comprising nanofibrillated cellulose (NFC) and polyvinyl alcohol (PVOH), wherein surface-modified cellulose nanofibres are utilized for improving the fibre-matrix adhesion and resulting in materials with excellent mechanical performance by, however, using low modified-NFC loadings.

One further advantage of the present invention in addition to excellent mechanical performance is that the thickness of a film produced from the composite can be reduced 5-times (i.e. thinner product design) compared to pure polyvinyl alcohol films.

Another advantage is that by the method of the present invention (by manufacturing the composite of the invention) it is possible to use 80% to 95% less polyvinyl alcohol compared to pure PVOH, and still obtain even better mechanical properties for the final products. Both of the above advantages result in material cost savings and thus reduce the production costs remarkably. Hence, the production method is cost-effective and the composites are biodegradable, durable, transparent, light-weighted and have good barrier-performance.

Next, the invention will be described more closely with references to the attached drawings and a detailed description.

DETAILED DESCRIPTION OF THE PREFERRED EMBODIMENTS OF THE INVENTION

Figure 1:
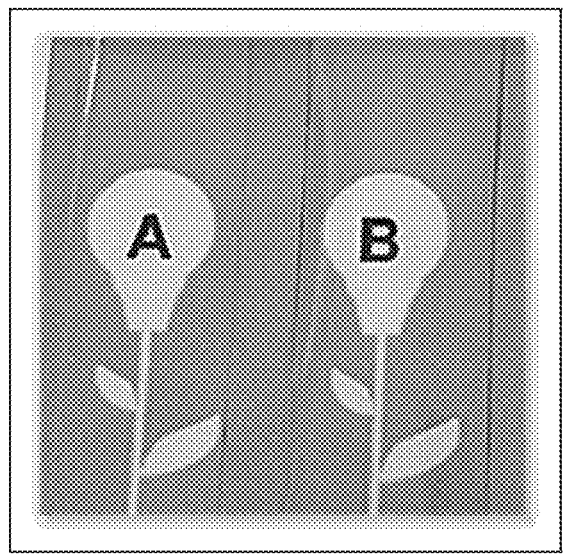
FIG. 1 shows that surface-modified nanofibrillated cellulose (NFC) reinforced polyvinyl alcohol (PVOH) films were successfully prepared. (A) is a picture of a pure PVOH film and (B) is a picture of a modified-NFC-PVOH film.
Figure 2:
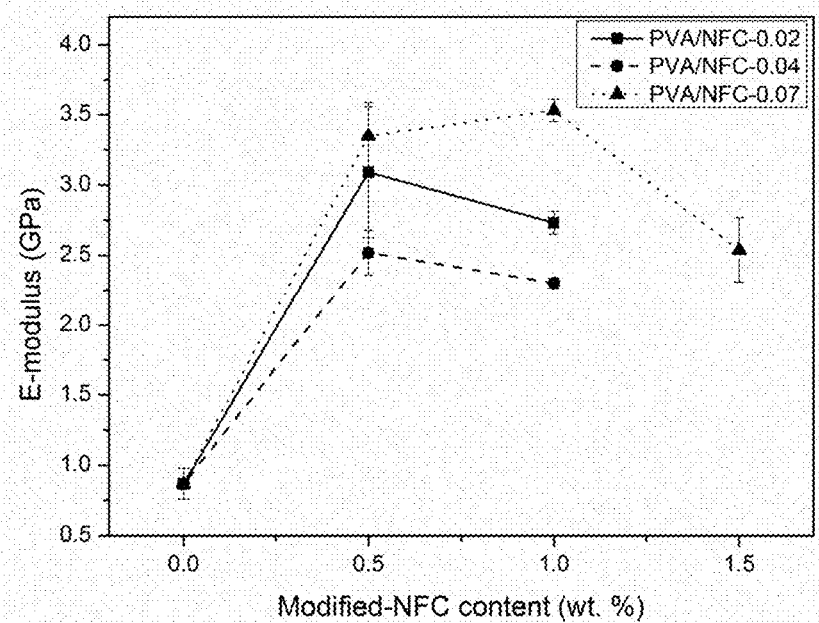
FIG. 2 describes the improved E-modulus of the NFC-PVOH film.
Figure 3:
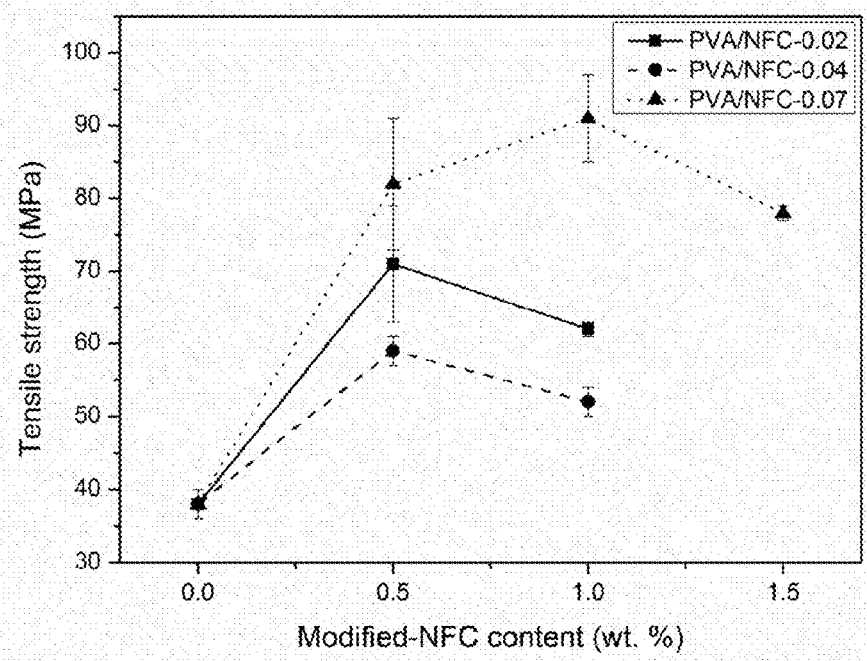
FIG. 3 describes the improved tensile strength of the NFC-PVOH film.
Figure 4:
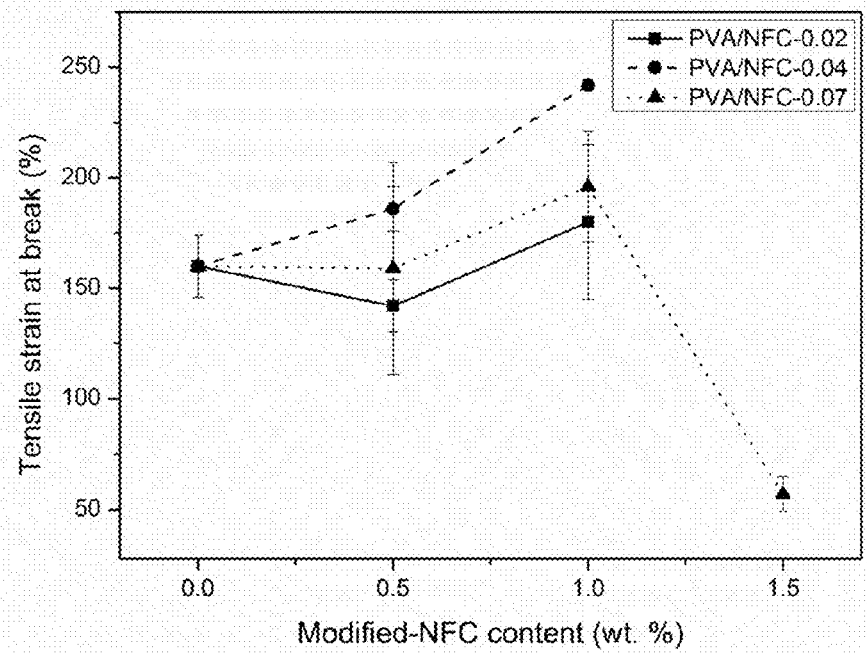
FIG. 4 describes the improved strain properties of the NFC-PVOH film.
Figure 5:
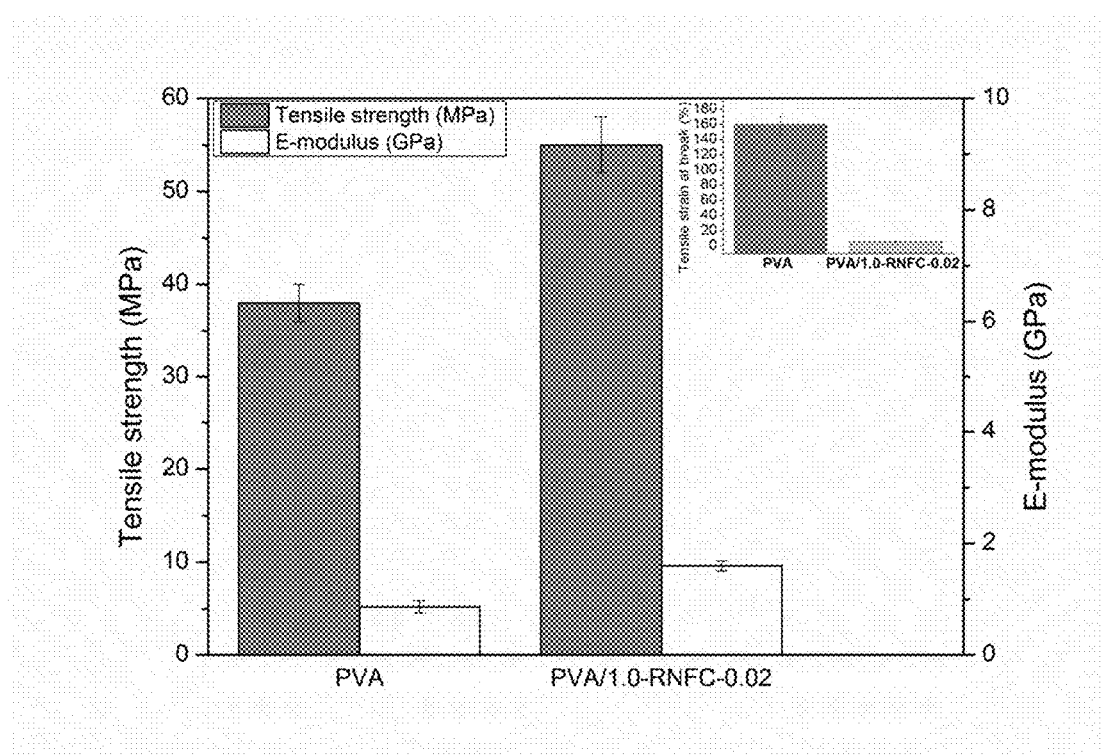
FIG. 5 describes the mechanical performance of NFC-PVOH film produced by reactive refining. Thus, FIG. 5 confirms that the concept is functional for scaling-up.

Herein below the following short terms are commonly used:
"DS" as in degree of substitution
"PVOH" and "PVA" as in polyvinyl alcohol
"NFC" as in nanofibrillated cellulose Characterizing to the present invention is that the hydroxyl groups on the surface of cellulose nanofibres are chemically modified by reacting them with at least one modification group i.e. by adding substituents with reactive functional groups such as allyl and/or epoxy groups. Thus, a modification group means a functional group which provides the cellulose with an increased reactivity towards polymer resins. By this method the number of free hydroxyl groups and, as a result the number of hydrogen bonds formed between the cellulose nanofibres, can be reduced. As a result of reduced hydrogen bonding, strong adhesion between the cellulose nanofibres can be prevented, and the cellulose nanofibres are well dispersed in a polymer material, thus interfacial bonds can be formed between the cellulose nanofibres and the polymer material.

A preferred chemical modification method includes a dry modification step, which preferably consists of an allylation of the hydroxyl groups on the surface of cellulose nanofibres by an allylation compound. In the present invention allylated cellulose has been prepared heterogeneously using only mild reaction conditions and without additional solvents. The reaction step is also fast and uses low amounts of water (thus the term "dry" modification). This new non-toxic dry modification step results in sufficient reinforcing effect and allows high reaction efficiencies for the reaction. In addition, this method has proven to result more homogenous composite materials, which have more functional groups replacing the hydroxyl groups on the cellulose (a higher DS) compared to prior solutions. In one embodiment up to 60% of the total free hydroxyl groups on the surface of cellulose nanofibres are chemically modified by the dry modification step. Other modification steps, such as the addition of an epoxy group, can follow the dry modification step.

One preferred modification group is an allyl group, added to the cellulose using an allylation compound that introduces a substituent that contains said allyl group(s). One example of suitable allylation compounds is allyl glycidyl ether. A particularly preferred modification group is an epoxy group, which can be added to the cellulose surface by further reacting said added substituent to incorporate said epoxy group(s). Thus, a reaction of the cellulose as described above results in either allylated or epoxidized cellulose nanofibres. Generally, the epoxidized cellulose will, however, still contain unreacted allyl groups.

Degree of substitution refers to the overall degree of substituted hydroxyl groups of cellulose fibres. Herein "Allyl DS" is the degree of hydroxyl groups substituted by allyl compounds in the allylated cellulose and is preferably ranging from 0.02 to 0.7. "Epoxy DS" is the further degree of allyl groups substituted by epoxy groups in the epoxidized cellulose and is preferably ranging from 0.02 to 0.07. "Total DS" is the total degree of hydroxyl groups substituted by allyl compounds (as in non-epoxy binding allyl groups) after allylation and epoxidation. Thereby the total DS according to a preferred embodiment is ranging from 0.02 to 0.7.

According to one embodiment, the allylation is carried out by adding allyl glycidyl ether among the cellulose fibres in dry (non-aqueous) conditions and mixing the solution for a period of 15 to 20 hours in a temperature between 40° C. and 50° C. The resulting allylated fibre is then filtered and washed with water. For further epoxidation of the fibre, the allylated fibre is mixed thoroughly with aqueous sodium carbonate/bicarbonate buffer solution.

When cellulose nanofibres are used as the cellulose raw material, the above described modification(s) result in the novel chemically modified cellulose nanofibres of the present invention.

The bio composite resin composition of the present invention comprises the surface-modified cellulose nanofibres in a biodegradable resin. In one embodiment the resin composition contains a thermoplastic resin such as polyvinyl alcohol (PVOH) as one of the resins, or preferably as the only resin. One important feature of the bio composite resin composition is low modified-NFC loadings. Preferably the amount of added cellulose raw material, originating e.g. from birch or pine, ranges from 0.5% to 1.5% by weight of a total composite raw material. It has been discovered herein that highest performing bio composite resin compositions are achieved with a total degree of substitution of cellulose nanofibres ranging between 0.02 and 0.7.

In the method for producing bio composite resin composition cellulose raw material is defibrillated, chemically modified with one or more of the above described modification steps, and mixed and reacted with resin. For example, the allylated cellulose nanofibres are epoxidized and refined followed by cross-linking with a thermoplastic resin to form the composite. The cross-linking reaction between the modified-NFC groups and thermoplastic resin is preferably activated by heating the mixture or by initiating the reactions with a catalyst, or by both, under continuous stirring at a constant temperature.

In one embodiment a method for producing a bio composite resin composition has the following steps:
 allylating cellulose fibres,
 epoxidising the allylated cellulose fibres to yield epoxy-cellulose dispersion(s),
 adding the epoxy-cellulose dispersion(s) to a thermoplastic (PVOH) resin solution(s),
 cross-linking the allylated and epoxidized cellulose groups and thermoplastic resin(s) by means of heating or by a catalyst or by both to obtain a reaction dispersion, and
 heating and mixing the reaction dispersion provided in the previous step,
further including a step of defibrillating the cellulose fibres.

It is noteworthy that cellulose fibres can be defibrillated either after or before surface modification of the hydroxyl groups to yield NFC fibres. Thus, it is also possible to apply the method of the present invention to a non-pretreated birch or pine cellulose kraft pulp. Cellulose fibres are defibrillated for example by mechanical shearing to a desired nano size, for example to an aspect ratio of 20 to 300 and an average diameter of 3 nm to 100 nm. Thus, herein term "cellulose fibres" means either normal cellulose fibres or nanofibrillated cellulose fibres (NFC), depending on whether the defibrillation takes place before or after surface-modification step(s).

The cross-linking reaction scheme follows epoxide ring-opening, where hydroxyl groups of PVOH act as nucleophiles and react with NFC's epoxide groups. Nucleophilic substitution ($S_N2$) tends to happen to a carbon atom which is less sterically hindered. The advantage is that the reaction can be performed in aqueous medium, thus offering a health safety environment and also lowering the process costs.

In one embodiment the epoxy-cellulose fibers are refined directly in a thermoplastic resin with a catalyst/curing agent and heating, instead of first preparing the modified epoxy-NFC, as described above, which is refined, and then separately preparing the composite resin composition by reactive dispersion. For example 1,6 diaminohexane is suitable for this purpose, reacting fast and fiercely with the epoxy group and crosslinking the structure. This way the number of process steps in the production of the composite material can be limited, and excessive steps can be avoided, thus resulting in more economically and industrially feasible process and furthermore a composite with improved mechanical properties.

According to one embodiment of the invention 2 wt-% of 1,6-diaminohexane of used epoxy-NFC results a ratio of 3.2 (amino groups per epoxy groups, mol/mol) when DS(epoxy) is 0.1. This indicates that amino groups and epoxy groups react together and result such cross-linked structure as described herein.

The casting-sheet composite body of the present invention is obtained by casting the composite resin composition, for example into a film, followed by drying it at an ambient temperature. Solution casting methods are generally known in the art. It has surprisingly been found out that 1 wt-% addition of modified NFC (having a DS of 0.07) enhances the modulus, strength and strain of the composite body by 307%, 139% and 23%, respectively, compared to a body of pure PVOH.

One advantage of the present invention is that modified-NFC has potential to significantly reinforce matrix polymer at low filler loadings. In a preferred embodiment loadings as low as 0.5 wt-% to 1.5 wt-% have surprisingly been proven to result a product which competes against the pure matrix polymer. The overall material and cost savings are achieved by a thinner product design (e.g. film design) i.e. reducing the thickness compared to pure PVOH composite structures (e.g. films). Such a product therefore also obtains a high light transmittance. An average light transmittance at wavelength of 500 nm of a composite resin film having a thickness of 100 μm and 1 wt-% of modified-NFC is above 75%, but preferably 85% or even more.

In one embodiment the thickness of NFC-PVOH composite film according to the present invention is one fifth (⅕) of the pure PVOH film. Thereby 80% thinner composite film design and as high as 80 to 95% reduction in the amount of PVOH can be achieved while still resulting in better mechanical properties compared to pure PVOH film. Thus, the present invention provides not only durable but also light-weight and transparent products.

There is currently a demand for high strength PVA-based products. The composite production concept of the present invention is applicable for casting but also for melt processing. Depending on the final use, the product specification can be optimized for example by altering the degree of substitution of the cellulose nanofibers. Possible commercial applications comprise water soluble products such as laundry bags, detergent and agrochemical packaging, the surface layer of dishwashing tablets, wash-away bags, biodegradable bags and injection molded components. One possible application field is polarizer films, which finds usage for example in LCD panels, lenses and optical filters. Herein below the present invention is illustrated by non-limiting examples. It should be understood, however, that the embodiments given in the description above and in the examples are for illustrative purposes only, and that various changes and modifications are possible within the scope of the claims.

EXAMPLE 1

Reactive Dispersion

The cellulose raw material included pulp obtained from bleached birch and pine kraft. 10 g of this cellulose fibre obtained from bleached birch and pine kraft was dried to a water content maximum of 50%. The cellulose fibres of the pulp were allylated by adding allyl glycidyl ether (in amounts of 0.4 to 1.2 mol/AGU), which was mixed with a solution containing 0.4 g of NaOH solubilized in 4.0 ml of water, followed by a thorough mixing of the resulting mixture with the fibre and stirring the mixture for a period of 16 hours at 45° C. The resulting allylated fibre (shown in the below Table 2 to have a DS(allyl) of 0.2) was then filtered and washed with water.

For epoxidation of the fibre, the allylated fibre was mixed thoroughly with aqueous sodium carbonate/bicarbonate buffer solution (containing 0.0035 g of $Na_2CO_3$ and 0.7 g of $NaHCO_3$ solubilized in 15 ml of acetonitrile). The mixture was heated to 30° C., and initiated by drop-wise addition of $H_2O_2 \cdot H_2O_2$ (35 wt-%, 10 ml) to the mixture within 30 min. The mixture was kept under stirring at constant temperature (30° C.) overnight. The thus epoxidated product (shown in the below Table 2 to have a DS(epoxy) of 0.02) was isolated by filtration, followed by washing with water.

The degree of substitution of the surface of the thus modified cellulose for both allyl groups and epoxy groups was determined using solid state $^{13}$CP/MAS spectroscopy. A sample for the NMR analysis was acquired by dialysing the material with a membrane (cut off 3500) for five days in water. The sample was dried using vacuum. Table 1 presents the achieved degrees of substitution for the allyl and epoxy groups on the cellulose surface, depending on the amount of used allyl glycidyl ether, respectively.

TABLE 1

Degree of substitution (DS) for allyl and epoxy groups

| Amount of allyl glycidyl ether | DS (allyl groups) | DS (epoxy groups) |
|---|---|---|
| 0.4 mol/AGU | 0.20 | 0.02 |
| 0.8 mol/AGU | 0.42 | 0.04 |
| 1.2 mol/AGU | 0.68 | 0.07 |

Nanofibrillation of the modified cellulose fibres was performed with a fluidizer (Microfluidics M-110EH, Microfluidics Int. Co., MA, USA). Prior to fibrillation, the dried kraft pulp was soaked with water in 1.8% solids content and pre-refined with a laboratory-scale grinder Masuko Supermasscolloider MKZA10-15J) reaching a Schopper-Riegler (SR) level over 90 SR. Then the pulp was passed through the fluidizer five times with an operating pressure of 1850 bars. The machine was equipped with a pair of ceramic (APM 400 m) and diamond interaction (IXC 100 m) chambers. The obtained aqueous gel-like NFC was solvent-exchanged to acetone. After solvent-exchange, the dry-matter content was 3-4%. The carbohydrate composition of the birch pulp and nanofibrillated cellulose was very similar containing 73% glucose, 26% xylose and 1% mannose. In addition 0.2% of residual lignin and 0.09% residual extractives were found from the pulp. The final material was visually homogeneous, and the fibrillar structures of lateral widths were in the range of 67-133 nm (observed by SEM).

EXAMPLE 2

Reactive Refining

Instead of first preparing the epoxy-NFC, refining the fibres, and then separately preparing the composite resin composition, the epoxy cellulose fibres were refined directly in the thermoplastic resin suspension by using reactive refining. The epoxy groups of modified-NFC-epoxy were reactivated with 1,6-diaminohexane (2 wt-% of epoxy-NFC amount) and by heating the suspension at 80° C. for 2 h under vigorous stirring.

Nanofibrillation of the modified cellulose fibres was performed in a similar manner as in Example 1.

EXAMPLE 3

Preparation of Composites and Films Thereof

Different amounts of the epoxy-NFC aqueous dispersions prepared in Example 1 were added in aqueous thermoplastic resin solutions. The mixtures were vigorously stirred overnight in order for the polymer to penetrate into the cellulose network. The crosslinking reaction between the modified-NFC-epoxy groups and the thermoplastic resin was initiated by using a hydrogen peroxide and heating the reaction dispersion to a temperature of 30° C. or by using the reactive refining described in Example 2.

The dispersion was cast by solution casting into a film, allowed to cool to room temperature and dried at ambient temperature for 7 days until the weight was constant. The final film thickness was approximately 100 μm. Furthermore, 100% NFC film was prepared from its 2 wt-% aqueous suspensions and dried at 55° C.

Table 2 presents the outstanding mechanical performance of films prepared from the modified-NFC-thermoplastic resin composites in terms of tensile strength (MPa), E-modulus (GPa) and tensile strain at break (%). For example PVOH/1,0-NFC-0.07 shows properties of a composite, wherein 1 wt-% of modified NFC (having a DS of 0.07) have been added to PVOH thermoplastic resin solution. PVOH (as a sample code) is a pure polyvinyl alcohol and NFC0 is a reference sample with unmodified NFC.

TABLE 2

Mechanical performance of the modified-NFC/ thermoplastic resin composites

| Sample code | Tensile strength (MPa) | E-modulus (GPa) | Tensile strain at break (%) |
|---|---|---|---|
| PVOH | 38 ± 2 | 0.87 ± 0.11 | 160 ± 14 |
| NFC0 | 141 ± 32 | 0.48 ± 0.28 | 6 ± 2 |
| PVOH/1.0-RNFC-0.02* | 55 ± 3 | 1.60 ± 0.09 | 6 ± 1 |
| PVOH/1.0-NFC0 | 40 ± 4 | 1.70 ± 0.25 | 185 ± 60 |
| PVOH/0.5-NFC-0.02 | 71 ± 8 | 3.09 ± 0.47 | 142 ± 12 |
| PVOH/1.0-NFC-0.02 | 62 ± 1 | 2.73 ± 0.08 | 180 ± 35 |
| PVOH/0.5-NFC-0.04 | 59 ± 2 | 2.52 ± 0.16 | 186 ± 10 |
| PVOH/1.0-NFC-0.04 | 52 ± 2 | 2.30 ± 0.04 | 242 ± 1 |
| PVOH/0.5-NFC-0.07 | 82 ± 9 | 3.35 ± 0.24 | 159 ± 48 |
| PVOH/1.0-NFC-0.07 | 91 ± 6 | 3.53 ± 0.08 | 196 ± 25 |
| PVOH/1.5-NFC-0.07 | 78 ± 1 | 2.54 ± 0.23 | 57 ± 8 |

*RNFC-reactive grinding

While the above description and examples show and describe and point out fundamental novel features of the invention as applied to a preferred embodiment thereof, it will be understood that various omissions and substitutions and changes in the details of the method and products may be made by those skilled in the art without departing from the spirit of the invention. For example, it is expressly intended that all combinations of those elements and/or method steps which perform substantially the same operations or give substantially the same results as those achieved above are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

CITATION LIST—PATENT LITERATURE

1. CN 102408691 B
2. JP 2011184816 A (corresponds to US 20120328877 A1)
3. WO 2012/127119

CITATION LIST—NON-PATENT LITERATURE

Arola, S., Tammelin, T., Setälä, H., Tullila, A., Linder, M. B., (2012), *Immobilization Stabilization of Proteins on*

*Nanofibrillated Cellulose Derivatives and Their Bioactive Film Formation*, Biomacromolecules, 13:594-603.

Bai, Y., Li, Y., Wang, M., (2006), *Study on synthesis of a hydrophilic bead carrier containing epoxy groups and its properties for glucoamylase immobilization*, Enzyme Microb Technol, 39: 540-547.

Burton, S., Harding, D., (1997), *Bifunctional etherification of bead cellulose for ligand attachment with allyl bromide and allyl glycidyl ether*, J Chromatogr A, 775: 29-38.

Cai, X., Riedl, B., Ait-Kadi, A., (2003), *Effect of Surface-Grafted Ionic Groups on the Performance of Cellulose-Fiber-Reinforced Thermoplastic composites*, J Pol Sci B Polym Phys, 41:2022-2032.

Heinze, T., Lincke, T., Fenn, D., Koschella, A., (2008), *Efficient allylation of cellulose in dimethyl sulfoxide/tetrabutylammonium fluoride trihydrate*, Polym Bull, 61:1-9.

Hu, Y., Li, D., Deng, Q., Wang, Y., Lin, D., (2012), *Novel poly (vinyl alcohol) nanocomposites reinforced with nano cellulose fibrils isolated from plants by mechanochemical treatment*, Applied Mechanics and Materials, Vols. 174-177, pp. 870-876.

Huijbrechts, A. M. L., ter Haar, R., Schols, H. A., Franssen, M. C. R., Boeriu, C. G., Sudhölter E. J. R., (2010), *Synthesis and application of epoxy starch derivatives*, Carbohydrate Polymers, Vol. 79, pp. 858-866, doi: 10.1016/j.carbpol.2009.10.012.

Lin, M. S., Huang, C. S., (1992), *Syntheses and characterizations of allyl cellulose and glycidyl cellulose*, J Polym Sci Part A: Polym Chem, 30(11): 2303-2312.

Mu-Shih, L., Chung-Song, H., (1992), *Syntheses and characterizations of allyl cellulose and glycidyl cellulose*, J Polym Sci A, 30:2303-2312.

Siqueira, G., Bras, J., Dufresne, A., (2010), *Cellulosic bionanocomposites: a review of preparation, properties and applications*, Polymers, 2:728-765.

Stenstad, P., Andresen, M., Tanem, B. S., Stenius, P., (2008), *Chemical Surface modifications of microfibrillated cellulose*, Cellulose, 15:35-45.

Tomasik, P., Schilling, C., (2004), *Chemical modification of starch*, Adv Carbohydr Chem Biochem, 59:175-403.

Wu, J., Yu, D., Chan, C.-M., Kim, J., Mai, Y.-W., (2000), *Effect of fiber pretreatment condition on the interfacial strength and mechanical properties of wood fiber/PP composites*, J Appl Pol Sci, 76:1000-1010.

The invention claimed is:

1. A method for producing a bio composite resin composition, wherein the method comprises the following steps:
   a) allylating cellulose fibres,
   b) epoxidising the allylated cellulose fibres to yield epoxy-cellulose dispersion(s),
   c) adding the epoxy-cellulose dispersion(s) to a thermoplastic polyvinyl alcohol resin solution(s),
   d) cross-linking the allylated and epoxidized cellulose groups and thermoplastic resin(s) by means of heating or by a catalyst or by both to obtain a reaction dispersion, and
   e) heating and mixing the reaction dispersion provided in step d), wherein the cellulose fibres are defibrillated prior to step a), or after step b) to obtain cellulose nanofibres (NFC fibres).

2. The method according to claim 1, wherein the cellulose fibres are obtained from a non-pretreated birch or pine cellulose kraft pulp.

3. The method according to claim 1, wherein the allylation is carried out with allyl glycidyl ether.

4. The method according to claim 1, wherein the cross-linking is activated by heating the mixture and initiating the reactions with hydrogen peroxide.

5. The method according to claim 1, wherein the cellulose fibres are defibrillated by mechanical shearing to an aspect ratio of 20 to 300 and an average diameter of 3 nm to 100 nm.

6. A method for producing a bio composite resin composition, wherein the method comprises the following steps:
   a) allylating cellulose fibres,
   b) epoxidising the allylated cellulose fibres to yield epoxy-cellulose dispersion(s),
   c) refining the epoxy-cellulose fibres directly in a thermoplastic polyvinyl alcohol resin with 1,6 diaminohexane and by heating the suspension, wherein the cellulose fibres are defibrillated prior to step a), or after step b) to obtain cellulose nanofibres (NFC fibres).

* * * * *